United States Patent [19]
Levins et al.

[11] Patent Number: 5,515,244
[45] Date of Patent: May 7, 1996

[54] LIGHT-TRANSMITTING PIPE

[75] Inventors: James K. Levins, Santa Clara; Steven B. Chase, Cupertino, both of Calif.

[73] Assignee: Apple Computer, Inc., Cupertino, Calif.

[21] Appl. No.: 415,468

[22] Filed: Apr. 3, 1995

[51] Int. Cl.⁶ .................................................. F21V 7/04
[52] U.S. Cl. ............................... 362/32; 362/26; 116/202
[58] Field of Search .................... 362/32, 26, 29, 362/31; 116/202, DIG. 5, DIG. 26, DIG. 28

[56] References Cited

U.S. PATENT DOCUMENTS

| | | | |
|---|---|---|---|
| 4,215,647 | 8/1980 | Fukasawa | 362/29 |
| 4,257,084 | 3/1981 | Reynolds | 362/31 |
| 4,716,501 | 12/1987 | McKee et al. | 362/31 |
| 4,918,577 | 4/1990 | Furudate | 362/26 |
| 5,268,823 | 12/1993 | Yergenson | 362/32 |
| 5,390,085 | 2/1995 | Mari-Roca et al. | 362/26 |

*Primary Examiner*—Denise L. Gromada
*Assistant Examiner*—Alfred Basichas
*Attorney, Agent, or Firm*—Burns, Doane, Swecker, & Mathis

[57] ABSTRACT

A light pipe for a personal computer transmits light from a lamp to an indicator window formed in the computer housing. The pipe is formed of a block of light-transmitting plastic material and includes a plurality of sections oriented perpendicular to one another. Light rays are reflected from each section to the next off an inclined light reflecting surface. One of the sections is of square cross section, and the next section is of non-square cross section. The light reflecting surface disposed at a junction between those two sections is of stepped configuration to form a series of sub-faces, each of which is inclined at a 45 degree angle relative to oncoming light rays for reflecting light across the entire cross section of the non-square section.

13 Claims, 4 Drawing Sheets

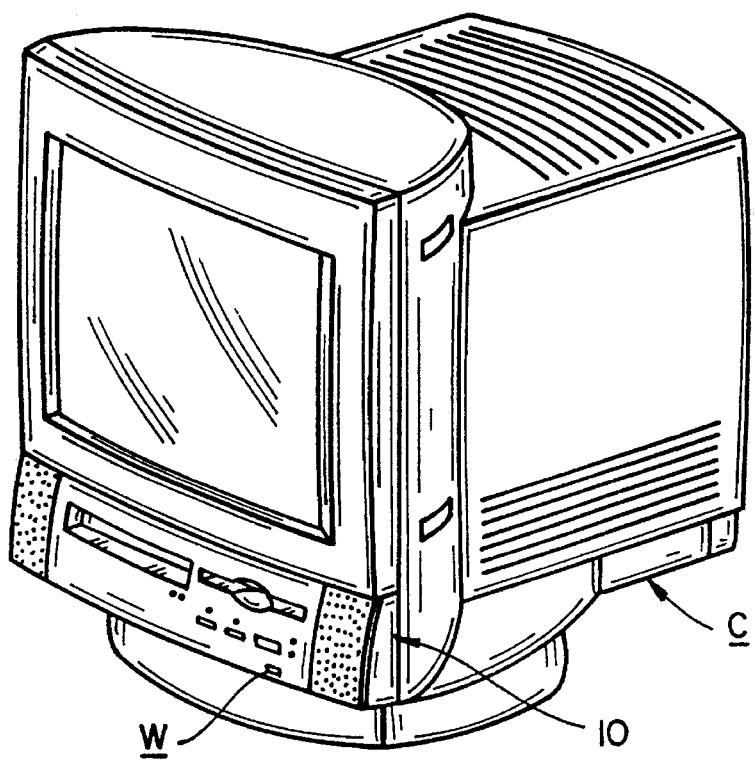
FIG_1
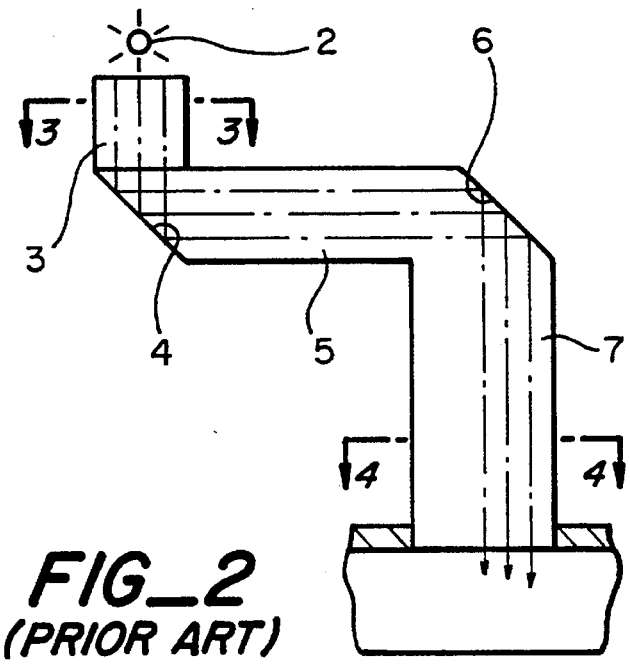
FIG_2
(PRIOR ART)
FIG_3
(PRIOR ART)
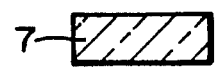
FIG_4
(PRIOR ART)

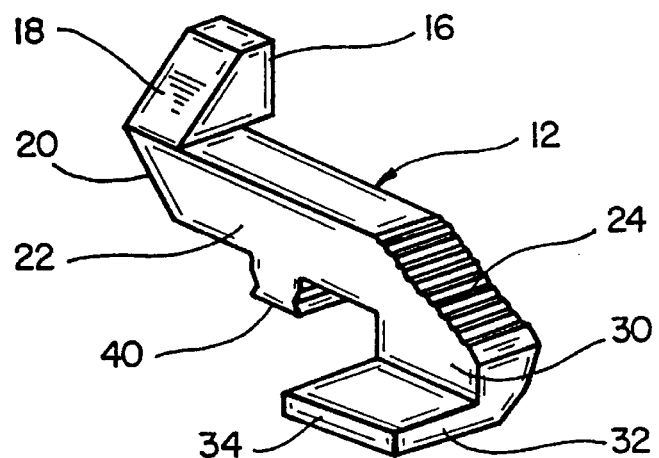
FIG_5
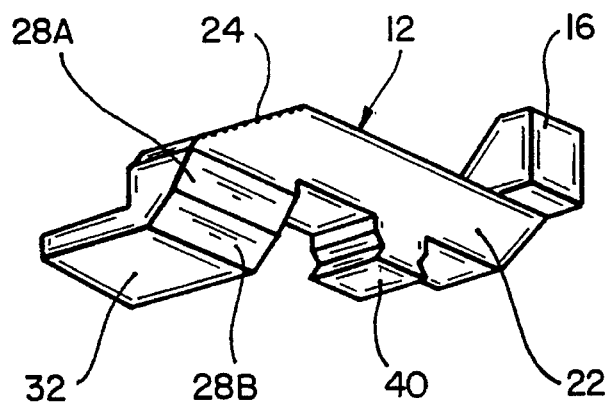
FIG_6
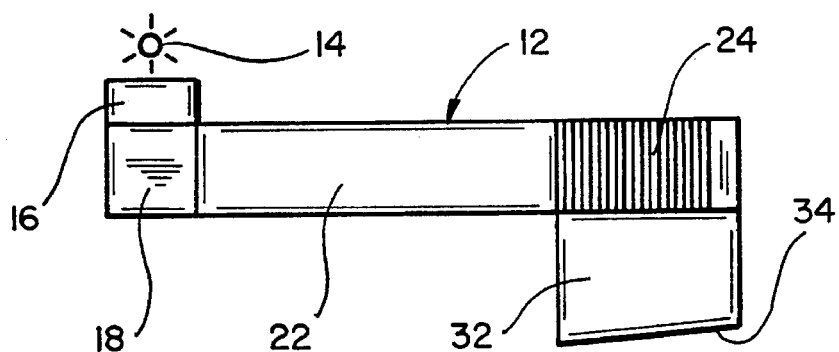
FIG_7

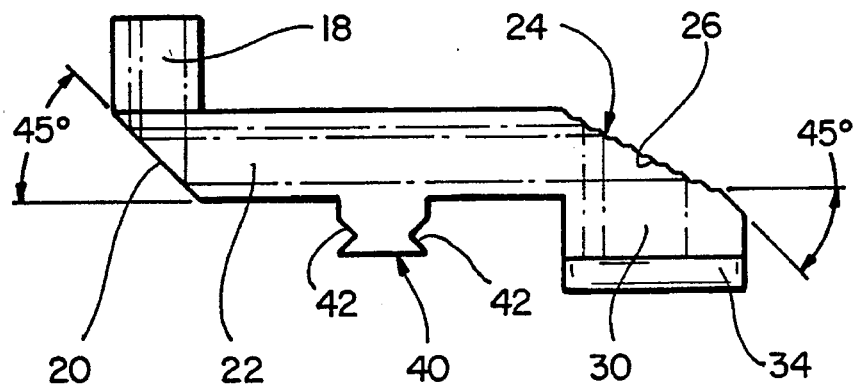
FIG_8
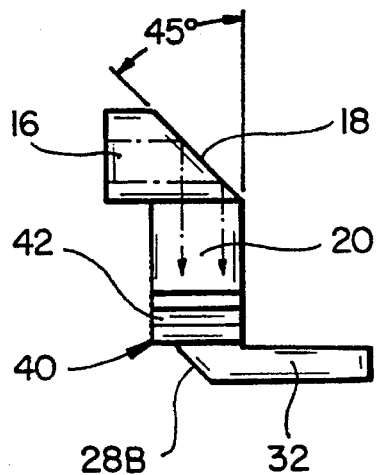
FIG_9
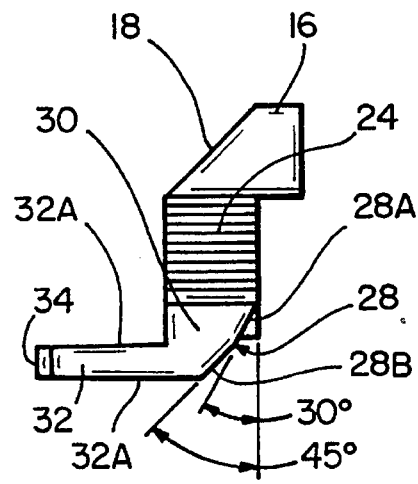
FIG_10
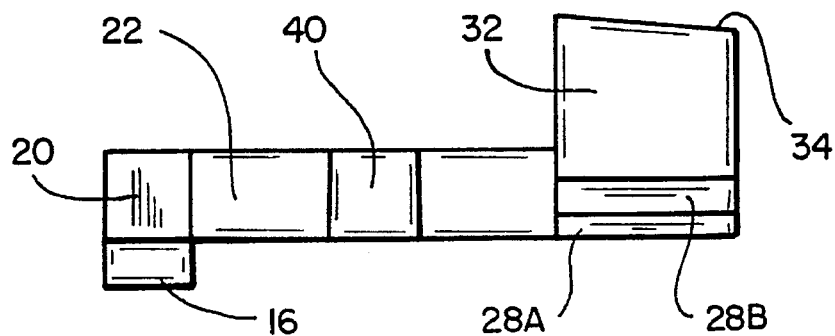
FIG_12

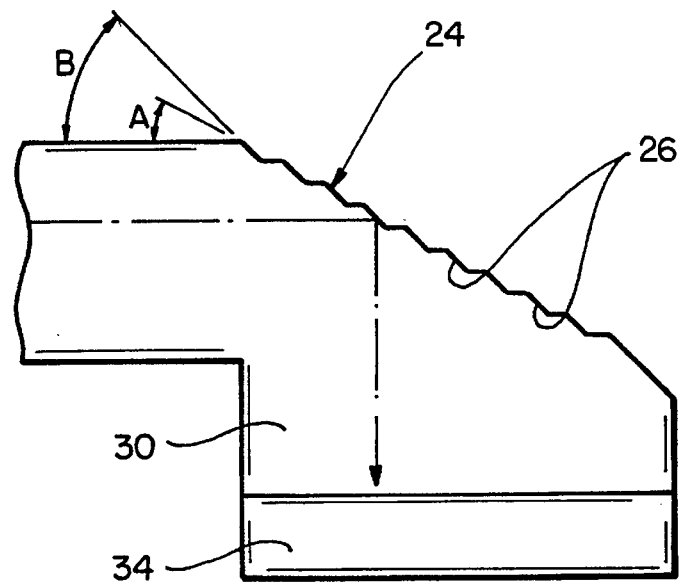
FIG_11
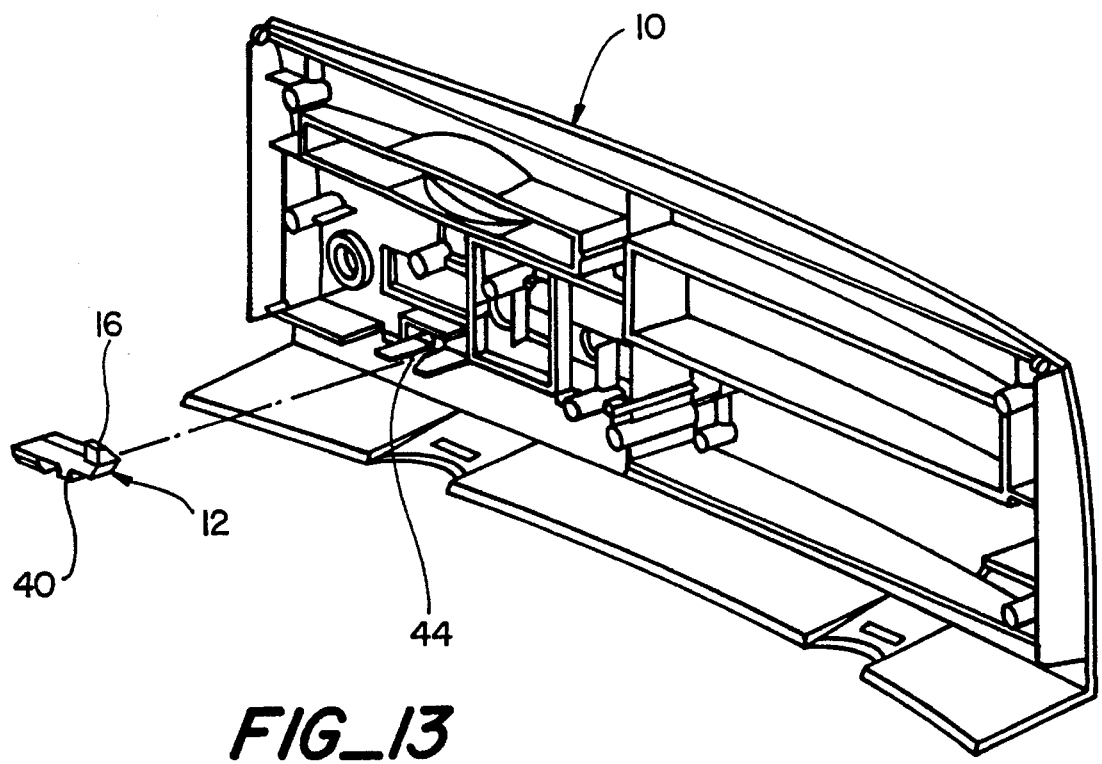
FIG_13

5,515,244

LIGHT-TRANSMITTING PIPE

BACKGROUND OF THE INVENTION

The present invention relates to a light pipe for transmitting light from a light source to an indicator window, e.g., to indicate that a certain system is in operation, especially in a personal computer.

It is conventional to provide instruments, such as personal computers for example, with an indicator window that is illuminated by a light source, to provide to a user a particular indication, e.g., an indication that the computer or some aspect thereof is in an "on" condition. For example, depicted in FIG. 1 is a personal computer C having an indicator window W.

It may occur, for certain design reasons, that the light source is not aligned with the indicator window. It is conventional in that event to provide a multi-angled light pipe formed of a light transmitting material such as plastic for transmitting the light from the light source to the indicator window. For example, depicted in FIG. 2 is a schematic view of a conventional light pipe 1 formed of a solid piece of plastic wherein light rays (shown in broken lines) from a lamp 2 are directed through a first section 3 of the pipe, reflect off a 45 degree smooth reflecting face 4, travel along a second pipe section 5, reflect off another 45 degree smooth reflecting face 6, and exit the pipe through a third pipe section 7 that extends through an opening or window 8 formed in an outer housing of the computer.

The cross section of the pipe may become changed in shape between the light inlet and outlet ends of the pipe. That is, the inlet end could be shaped to maximize light input, whereas the output end could be shaped to conform to the shape of the indicator window. For example, the first and second pipe sections 3, 5 could be of square cross section (see FIG. 3), and the third section 7 could be of an elongated rectangular shape (see FIG. 4) that corresponds to the shape of the window 8. However, as a result of the transformation in shape of the pipe, light reflected from the face 6 travels only along one half of the third section 7 (i.e., the right half in FIG. 2), whereby the light may be visible in only half of the viewing end of the light pipe.

Therefore, it would be desirable to provide a light pipe which eliminates that problem and enables the entire window to be illuminated with light, eliminating so-called "hot spots".

SUMMARY OF THE INVENTION

The present invention relates to a light pipe for transmitting light from a light source to a window that is offset from the light source. The light pipe comprises a body of light-transmitting material which includes at least two light-conducting sections oriented at an angle relative to one another. One of the sections is located upstream of the other with reference to a direction of light travel. The downstream section has a different cross-section than the upstream section. An inclined reflecting surface is located at a junction between the upstream and downstream sections for reflecting light from the upstream section to the downstream section. The reflecting surface is of stepped configuration to define a plurality of individual reflecting sub-faces for reflecting light across substantially the entire cross-section of the downstream section.

Each of the sub-faces is preferably oriented at a 45° angle relative to oncoming light rays.

Some of the sub-faces could be textured to achieve a greater diffusion of the light.

The body of the light pipe is preferably solid and formed of a plastic material.

The present invention also relates to the combination of a personal computer and the light pipe. The personal computer comprises a computer frame and an exterior housing mounted on the frame. The light source is disposed in the frame and the indicator window is arranged in the housing in offset relationship to the light source. The light pipe transmits the light from the light source to the window.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 1 is a front perspective view of a personal computer containing a light pipe according to the present invention;

FIG. 2 is a schematic view of a prior art light pipe which is transmitting light rays (shown in broken lines) from a light source to a window;

FIG. 3 is a cross-sectional view taken along the line 3—3 in FIG. 2;

FIG. 4 is a cross-sectional view taken along the line 4—4 in FIG. 2;

FIG. 5 is a top perspective view of a light pipe according to the present invention;

FIG. 6 is a bottom perspective view of the light pipe shown in FIG. 5;

FIG. 7 is a top plan view of the light pipe shown in FIG. 5 depicting the relationship thereof to a light source and a window;

FIG. 8 is a side elevational view of the light pipe depicted in FIG. 5, the light pipe transmitting light rays shown in broken lines;

FIG. 9 is an end view of the light pipe depicted in FIG. 8 as viewed from the left side of FIG. 8, with light rays transmitted by the light pipe being shown in broken lines;

FIG. 10 is an end view of the light pipe depicted in FIG. 8 as viewed from the right side of FIG. 8;

FIG. 11 is an exploded fragmentary view of a portion of the light pipe depicted in FIG. 8;

FIG. 12 is a bottom plan view of the light pipe depicted in FIG. 5; and

FIG. 13 is a perspective view of a backside of a cover of a personal computer, showing the location of the light pipe therein.

DETAILED DESCRIPTION OF A PREFERRED EMBODIMENT OF THE INVENTION

Depicted in FIG. 13 is a rear view of a front cover plate 10 of the personal computer C of FIG. 1 in which a light pipe 12 according to the present invention is mounted. The light pipe 12, depicted in FIGS. 5–12, is arranged to transmit light from a lamp 14 to an indicator window W. The light pipe 12 is formed of a solid piece of highly polished plastic and includes a first section 16 serving as a light inlet and having a square cross section. Light rays (shown in broken lines in FIGS. 8, 9 and 11) entering the first section travel to a first inclined reflecting surface 18 inclined at 45° to the oncoming light rays and which reflects the light toward a second inclined reflecting surface 20 disposed at an upstream end of a second section 22 of square cross section. The second reflecting surface 20 is also inclined at 45° to the oncoming light rays to reflect the light toward a third reflecting surface 24 located at a downstream end of the second section 22. That reflecting surface 24 is of stepped configuration in that it comprises a series of sub-faces 26 each inclined at an angle B of 45° relative to the oncoming light rays to reflect the rays toward a fourth reflecting surface 28 of a third section 30. The third section 30 is of elongated (non-square) rectangular configuration, and the fourth reflecting surface 28 reflects oncoming light rays toward a fourth section 32 of the light pipe which forms a light outlet surface 34 facing the window W. That fourth section 32 is of elongated rectangular cross section, as is the outlet surface 34.

The fourth reflecting surface 28 comprises a pair of surface portions 28A, 28B inclined at angles of 30° and 45°, respectively, to oncoming light rays. Light rays reflecting off the 45° surface portion 28B will travel through the fourth section 32 in a direction parallel to the top and bottom surface of that section 32. However, light rays reflecting off the 30° surface portion 28A will travel downwardly toward the bottom surface 32A of the section 32 and reflect therefrom toward the top surface portion 32B and back to the bottom surface portion and so on until reaching the outlet 34. That reflecting action is made possible by highly polishing the outer periphery of the pipe to a very smooth finish.

The third reflecting surface 24 has to be inclined at an overall angle A (see FIG. 11) of less than 45° in order to function as a transition between the square and non-square cross sections 22, 30 of the pipe. By forming that surface 24 of stepped configuration, especially wherein the sub-faces 26 are inclined at a 45° angle B, light is reflected along virtually the entire cross section of the third section 30 rather than along only a portion of the cross section such as described earlier herein in connection with FIG. 2. Hence, the outlet surface 34 will be fully illuminated, with the light exiting therefrom being visible across the entire surface 34.

The stepped configuration of the surface 24 is preferably formed in the pipe at the time of molding the pipe.

In order to even better diffuse the light, the reflecting surfaces 28a and 28b are textured. The texturing is accomplished at the time of molding the pipe, or after the pipe has been formed, e.g., by a roughening procedure.

The pipe 12 can be mounted in the cover plate 10 in any suitable manner. Preferably, the second section 22 is provided with a downwardly projecting post 40 having a pair of notches 42. The post 40 can be slid into a slot 44 of the cover 10 (see FIG. 12), the slot having projections received in the notches 42.

In the preferred embodiment the light rays enter the first section 16 in a horizontal direction, are reflected downwardly by the surface 18, then are reflected horizontally by the surface 20, then are reflected downwardly by the sub-faces 26. Some of the light rays are reflected horizontally by the surface portion 28B, and other light rays are reflected downwardly at an oblique angle by the surface 28A whereupon they reflect off the top and bottom surfaces of the outlet section 32 before exiting via surface 34. Although the light pipe has been disclosed as oriented to discharge light in a horizontal direction, it could be disposed at any desired orientation.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A light pipe for transmitting light from a light source to a window that is offset from the light source, the light pipe comprising a body of light-transmitting material including:

at least two light conducting sections oriented at an angle relative to one another, one of said sections located upstream of the other with reference to a direction of light travel, said downstream section having a different cross section than said upstream section; and an inclined reflecting surface located at a junction between said upstream and downstream sections for reflecting light from said upstream section to said downstream section, said reflecting surface being of stepped configuration to define a plurality of individual reflecting sub-faces for reflecting light across substantially the entire cross section of said downstream section.

2. The light pipe according to claim 1 wherein each of said sub-faces is oriented at a 45 degree angle relative to oncoming light rays.

3. The light pipe according to claim 1 wherein said sub-faces are polished.

4. The light reflecting pipe according to claim 1 wherein said upstream and downstream sections are oriented perpendicular to one another.

5. The light pipe according to claim 1 wherein said upstream section is of square cross-sectional shape, said downstream section being of elongated rectangular cross section.

6. The light pipe according to claim 1 wherein said downstream section includes an additional light reflecting surface disposed at a junction between said downstream section and another section of said pipe, said additional light reflecting surface comprising a pair of portions inclined at different respective angles relative to oncoming light rays.

7. The light pipe according to claim 1 wherein said body is solid and formed of plastic.

8. A light pipe for transmitting light from a light source to a window which is offset from said light source, said light pipe comprising a solid body of light-transmitting plastic material including:

a first, second, third, and fourth sections for transmitting light rays, said second section oriented perpendicular to said first section, said third section oriented perpendicular to said second section, and said fourth section oriented perpendicular to said third section; a first reflecting surface disposed at a downstream end of said first section, and being inclined at a 45 degree angle relative to oncoming light rays for reflecting the light rays toward a second reflecting surface located at an upstream end of said second section, said second reflecting surface oriented at a 45 degree angle relative to the oncoming light rays for deflecting the rays toward a third reflecting surface located at a downstream end of said second section, said second and third sections being of different cross sectional shapes;

said third reflecting surface being of stepped configuration to form a series of sub-faces, each sub-face oriented at a 45 degree angle relative to oncoming light rays to reflect light rays across substantially the entire cross section of said third section toward a fourth reflecting surface located at a downstream end of said third section, said third reflecting surface reflecting light toward said fourth section.

9. The light pipe according to claim 8 wherein said fourth light reflecting surface comprises first and second surface portions oriented at different angles relative to oncoming light rays.

10. A personal computer comprising a computer frame and an exterior housing mounted on said frame, a light source in said frame, an indicator window arranged in said housing in offset relationship to said light source, and a light pipe for transmitting light from said light source to said window, said light pipe comprising a body of light-transmitting material including at least two light transmitting sections oriented at an angle relative to one another, one of said sections located upstream of the other with reference to a direction of light travel, said downstream section having a different cross-sectional shape than said upstream section, and an inclined reflecting surface located at a junction between said upstream and downstream sections for reflecting light from said upstream section to said downstream section, said reflecting surface being of stepped configuration to define a plurality of individual reflecting sub-faces for reflecting light across substantially the entire cross section of said downstream section.

11. The personal computer according to claim 10 wherein each of said sub-faces is oriented at a 45 degree angle relative to oncoming light rays.

12. The personal computer according to claim 10 wherein said sub-faces are polished.

13. The personal computer according to claim 10 wherein said upstream section is of square cross-sectional shape, said downstream section being of elongated rectangular cross section.

* * * * *